United States Patent [19]
Gelardi

[11] 3,966,138
[45] June 29, 1976

[54] CASTING FISHING REEL
[75] Inventor: August P. Gelardi, Pacifica, Calif.
[73] Assignee: The Raymond Lee Organization, Inc., New York, N.Y. ; a part interest
[22] Filed: Jan. 14, 1975
[21] Appl. No.: 541,013

[52] U.S. Cl. .......................................... 242/84.2 B
[51] Int. Cl.² ........................................ A01K 89/04
[58] Field of Search .......... 292/84.2 B, 84.1, 84.2 R

[56] References Cited
UNITED STATES PATENTS

| | | | |
|---|---|---|---|
| 2,649,257 | 8/1953 | Shelburne | 242/84.2 B |
| 2,674,057 | 4/1954 | Stewart | 242/84.2 B X |
| 3,039,716 | 6/1962 | Visockis | 242/84.2 B |

FOREIGN PATENTS OR APPLICATIONS

| | | | |
|---|---|---|---|
| 1,123,153 | 6/1956 | France | 242/84.2 B |
| 438,633 | 8/1948 | Italy | 242/84.2 B |
| 583,350 | 12/1946 | United Kingdom | 242/84.2 B |

Primary Examiner—Edward J. McCarthy
Attorney, Agent, or Firm—Howard I. Podell

[57] ABSTRACT

A fishing reel for free casting purposes. The reel is mounted in a rotatable fitting attached to a fishing rod so that the axis of the reel may be rotated to lie parallel to the attached rod, when casting, or rotated to be perpendicular to the rod when reeling in the fishing line of the reel.

3 Claims, 3 Drawing Figures

CASTING FISHING REEL

SUMMARY OF THE INVENTION

My invention is a fishing reel for free casting purposes. The reel is mounted in a rotatable fitting attached to a fishing rod so that the axis of the reel may be rotated to lie parallel to the attached rod, when casting, or rotated to be perpendicular to the rod when reeling in the fishing line of the reel.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
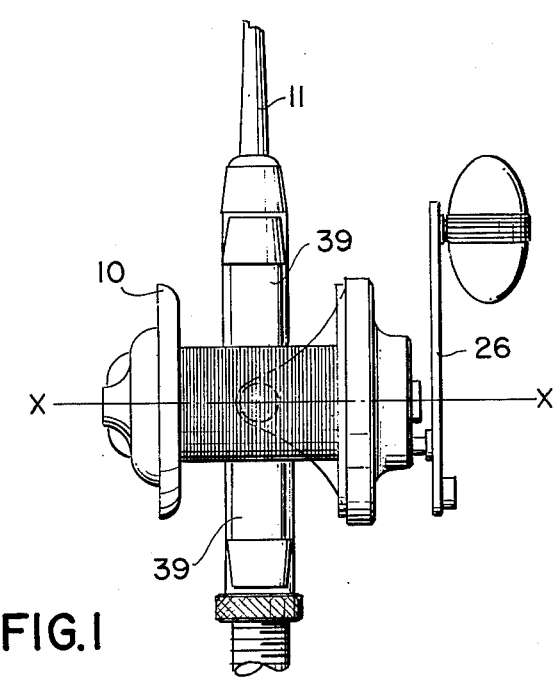
FIG. 1 is a plan view of the reel attached to a rod for reeling in the line.
Figure 2:
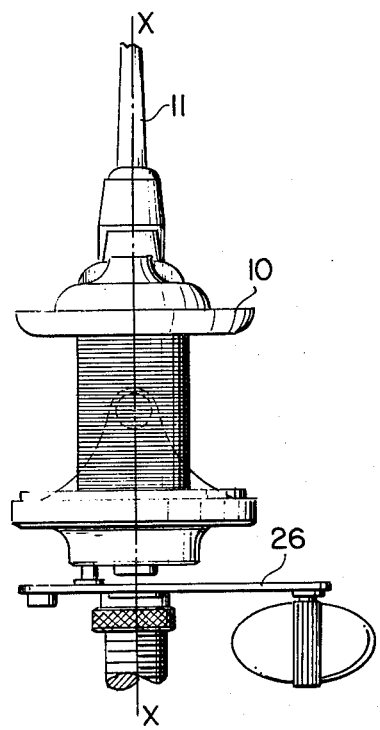
FIG. 2 is a plan view of the reel attached to the rod for casting purposes.
Figure 3:
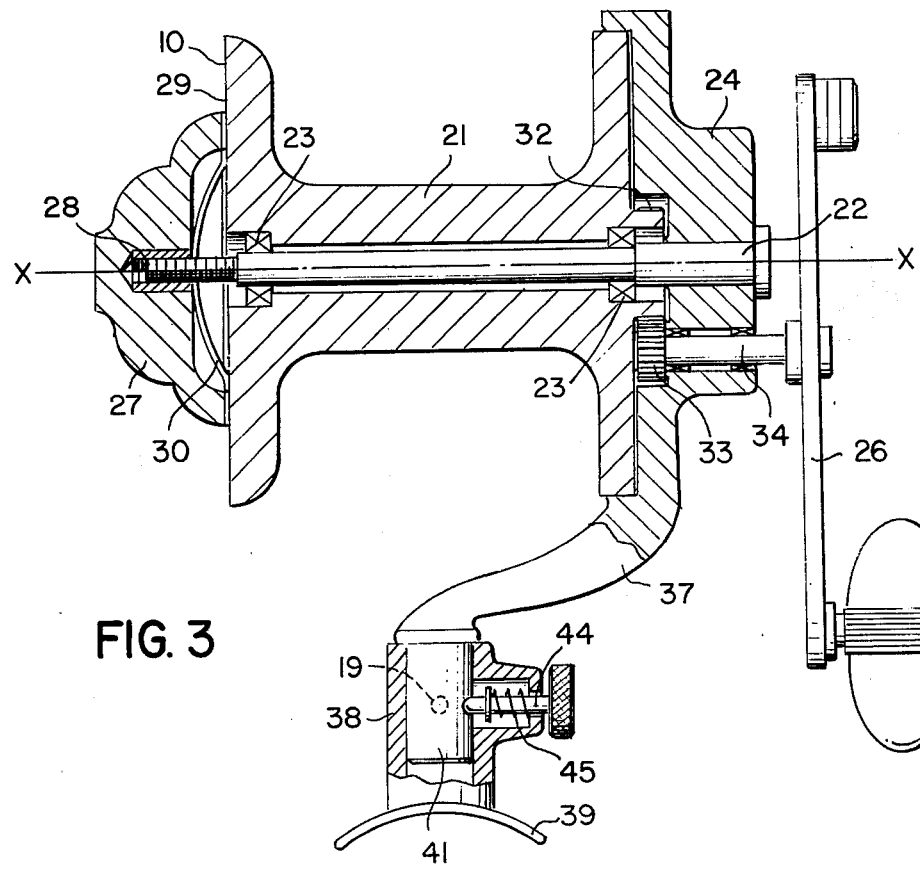
FIG. 3 is a sectional view of the reel.

Turning now descriptively to the drawings, in which similar reference characters denote similar elements throughout the several views, FIGS. 1–3 illustrate the reel 10 which may be mounted on a fishing rod 11 so that the axis X—X of the reel 10 is perpendicular to the axis of the attached fishing rod 11 as shown in FIG. 1 for reeling purposes, or parallel to the axis of the rod 11 for casting purposes as shown in FIG. 2.

Reel 10 is formed with a rotatable hollow spindle 21 on which line may be wound, with spindle 21 mounted on axle 22 mounted on bearings 23 fixed to the spindle 21 and with spindle 21 fixed to the reel housing 24, by a threaded end member 27 which mates with a screw thread 28 at one end of axle 22. End member 27 is frictionally engaged to a side 29 of spindle 21 by a flat spring 30, which provides a variable drag on the rotation of spindle 21. A gear 32 on one end of spindle 21 engages a spur gear 33 mounted on an axle 34 attached to an external rotatable handle 26. Housing 24 is formed with a curved support member 37 that is rotationally in a sleeve member 38 fitted with curved strap means 39 to fasten to a fishing rod 11. Support member 37 is of a size and shape, in relation to handle 26, so that handle 26 may freely rotate without striking the attached rod 11 when the axis X—X the reel 10 is aligned parallel to the axis of attached rod 11. Support 37 is formed at its free end 41 as a cylindrical plug of a size to rotate in hollow sleeve 38, with two perpendicularly oriented holes 19 in plug section 41 serving alternately as a stop, engageable by spring mounted pin 44 held by a compression spring 45 against plug section 41 and fitted in sleeve 38.

For casting purposes, pin 44 is manually lifted out of engagement with plug hole 19 and the entire reel 10 is rotated about the axis of plug 41 in sleeve 38 so that the axis X—X of the reel is aligned with the axis of the attached rod 11 and the pin 44 is allowed to engage the proper plug hole 19 to hold the reel in the casting alignment. In this position, shown in FIG. 2, the handle 26 of the rod rotates freely, without catching, as line is paid out of the spindle in casting.

When the user desires to reel the line in on the spindle, the process is reversed and the reel is rotated into the conventional orientation shown in FIG. 1.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A fishing reel fitted with a support arm for fastening to a fishing rod, with means to rotate the reel in the attached position to a first position in which axis of the spindle of the reel is oriented parallel to the axis of the rod for casting purposes, or alternately to rotate the reel to a second position in which the axis of the spindle of the reel is oriented perpendicular to the axis of the rod for reeling purposes, said means serving to positively latch the reel in either the said first position or the said second position, with the support arm of the reel formed with a cylindrical plug member rotationally engaged in a sleeve member fitted to a member that is attachable to a fishing rod, said cylindrical plug member formed with a pair of recessed holes, the axes of which are in a common plane, perpendicular to each other and perpendicular to the axis of the cylindrical plug member, with said sleeve member fitted with a detent member slidably mounted on a through hole of the sleeve member, the axis of said detent and hole being in the plane of the axes of the holes in the plug in the assembled mode, said detent of a length to project both externally of the sleeve member and internally into one of the holes of the plug member when the plug member is rotated so as to align a plug hole with the detent member.

2. The combination as recited in claim 1 in which the detent member is spring-biased with relation to the sleeve member so as to bear against the plug member.

3. The combination as recited in claim 1 in which the plug member is slidably removable from the sleeve member when the detent member is released from engagement with the plug member.

* * * * *